(12) United States Patent
Ishikawa

(10) Patent No.: US 10,832,081 B2
(45) Date of Patent: Nov. 10, 2020

(54) IMAGE PROCESSING APPARATUS AND NON-TRANSITORY COMPUTER-READABLE COMPUTER MEDIUM STORING AN IMAGE PROCESSING PROGRAM

(71) Applicant: SEIKO EPSON CORPORATION, Tokyo (JP)

(72) Inventor: Yuji Ishikawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 98 days.

(21) Appl. No.: 16/262,325

(22) Filed: Jan. 30, 2019

(65) Prior Publication Data
US 2019/0236398 A1  Aug. 1, 2019

(30) Foreign Application Priority Data
Jan. 31, 2018  (JP) .................................. 2018-014374

(51) Int. Cl.
*G06K 9/46*  (2006.01)
*G06F 40/174*  (2020.01)

(52) U.S. Cl.
CPC ........... *G06K 9/468* (2013.01); *G06F 40/174* (2020.01)

(58) Field of Classification Search
CPC .. G06K 2209/01; G06K 9/72; G06K 9/00456; G06K 9/00469; G06K 9/00442
See application file for complete search history.

(56) References Cited

U.S. PATENT DOCUMENTS 7,065,261 B1 *  6/2006  Horie ................... G06K 9/3283
                                             348/E5.055
7,765,271 B1 *  7/2010  Bahr ................... H04N 1/00222
                                             358/1.15
(Continued)

FOREIGN PATENT DOCUMENTS

EP      1 580 666 A2    9/2005
JP      2016-189174 A   11/2016

OTHER PUBLICATIONS

Anonymous: "BizCardReader Features", Internet Citation, Jun. 2, 2001 (Jun. 2, 2001), Retrieved from the Internet URL: http://web.archive.org/web/2001 0803025823/bizcardreader.co ml Features.htm#BizCard Reader%20 Features [retrieved on Nov. 9, 2006].
(Continued)

*Primary Examiner* — Yosef Kassa
(74) *Attorney, Agent, or Firm* — Chip Law Group

(57) ABSTRACT

There is provided an image processing apparatus including a control unit that acquires document image data generated by reading a document and recognizes character strings included in the document image data by character recognition and a storage unit that stores a specific rule for extracting an issuer of the document, in which the control unit extracts a first character string from the character strings included in the document image data based on the specific rule, extracts a second character string which matches at least a part of the first character string from a portion other than the first character string among the character strings included in the document image data, and determines the first character string or the second character string as the issuer.

9 Claims, 5 Drawing Sheets

(56) References Cited

U.S. PATENT DOCUMENTS

| | | | | |
|---|---|---|---|---|
| 7,765,481 B2* | 7/2010 | Dixon | ................. | G06Q 30/02 |
| | | | | 705/26.8 |
| 7,822,620 B2* | 10/2010 | Dixon | ................. | G06Q 30/02 |
| | | | | 705/1.1 |
| 8,139,870 B2* | 3/2012 | Kato | .................. | G06K 9/72 |
| | | | | 382/140 |
| 8,954,845 B2* | 2/2015 | Misawa | ............. | G06F 40/134 |
| | | | | 715/256 |
| 9,026,516 B1* | 5/2015 | Chapin | ............ | G06F 16/9537 |
| | | | | 707/706 |
| 2001/0037330 A1 | 11/2001 | Honma et al. | | |

OTHER PUBLICATIONS

Extended European Search Report issued in EP Appl. No. 19154903.9 dated Jun. 3, 2019 (9 pages).

* cited by examiner

IMAGE PROCESSING APPARATUS AND NON-TRANSITORY COMPUTER-READABLE COMPUTER MEDIUM STORING AN IMAGE PROCESSING PROGRAM

BACKGROUND

1. Technical Field

The present invention relates to an image processing apparatus and an image processing program for processing document image data generated by reading a document.

2. Related Art

In related art, in order to specify a store name, a business name, and the like that are issuers of documents such as receipts and business forms, there is known a method of acquiring text data from image data by executing optical character recognition (OCR) processing on image data of a receipt image, extracting a character string indicating a telephone number from the text data, transmitting the extracted telephone number to a location information service server, and specifying the store name as the issuer of the receipt corresponding to the location information (refer to JP-A-2016-189174).

However, the method according to JP-A-2016-189174 includes a step of transmitting a phone number to an external server and specifying a store name corresponding to location information by analyzing an XML file including valid location information corresponding to an HTTP request received from the server, and the processing required until the store name is specified is complicated. In addition, it is required to appropriately determine the store name, business name, or the like which is the issuer of the document based on the document image data generated by reading the document such as a receipt or business form.

SUMMARY

According to an aspect of the invention, there is provided an image processing apparatus including a control unit that acquires document image data generated by reading a document and recognizes character strings included in the document image data by character recognition and a storage unit that stores a specific rule for extracting an issuer of the document, in which the control unit extracts a first character string from the character strings included in the document image data based on the specific rule, extracts a second character string which matches at least a part of the first character string from a portion other than the first character string among the character strings included in the document image data, and determines the first character string or the second character string as the issuer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to drawings. Each drawing is merely an example for describing the present embodiment.

1. Schematic Description of Apparatus Configuration

Figure 1:
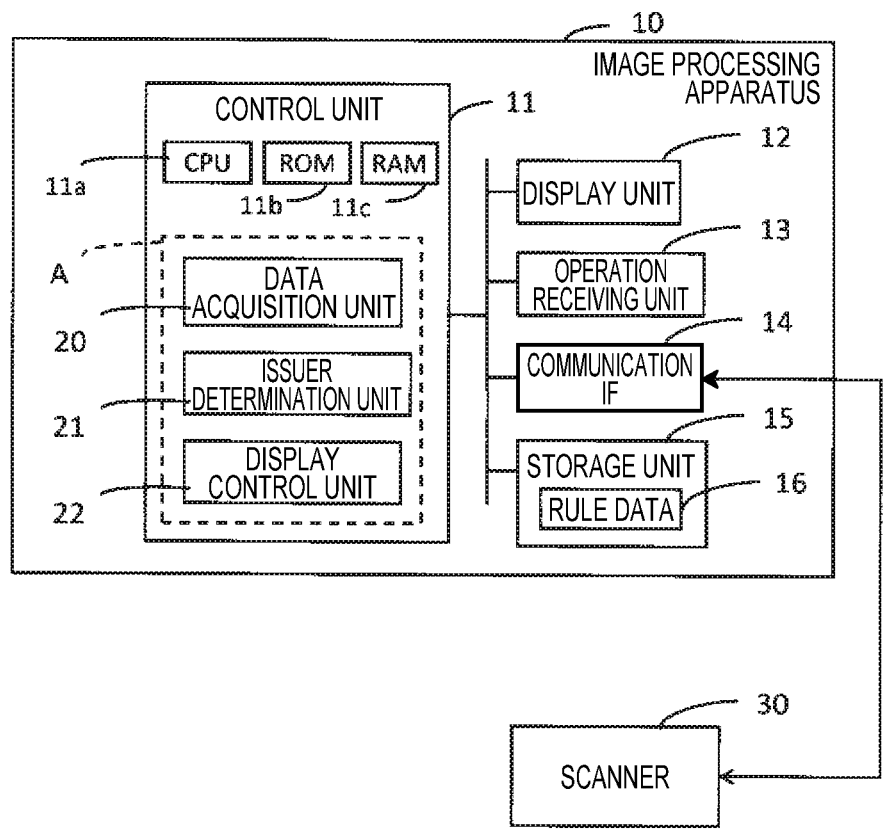
FIG. 1 is a diagram showing a configuration of an image processing apparatus in a simplified manner.

FIG. 1 simply shows a configuration of an image processing apparatus 10 according to the embodiment. The image processing apparatus 10 communicably connects with a reading apparatus (scanner 30) that optically reads a document, generates image data of a predetermined format as a reading result, and outputs the image data to the outside. The scanner 30 may be any device that functions as an image reading device including known products.

The image processing apparatus 10 is realized by, for example, a personal computer (PC), a smartphone, a tablet type terminal, a cellular phone, or an information processing apparatus having processing capability equivalent to those. In addition, hardware capable of realizing a control unit 11 according to the embodiment may be called an image processing apparatus.

The image processing apparatus 10 includes a control unit 11, a display unit 12, an operation receiving unit 13, a communication interface (IF) 14, a storage unit 15, and the like. The control unit 11 is configured to appropriately include one or a plurality of ICs having a processor (for example, a CPU 11$a$, an ASIC, or an ASIC and a CPU, and the like may cooperate with each other), a ROM 11$b$, a RAM 11$c$, and the like, or other memory and the like. The storage unit 15 is, for example, a non-volatile storage device such as a hard disk drive (HDD) or a flash memory. The storage unit 15 may be a part of the control unit 11.

In the control unit 11, the processor (CPU 11$a$) controls the image processing apparatus 10 by executing arithmetic processing according to a program saved in the ROM 11$b$, the storage unit 15, and the like, using the RAM 11$c$ and the like as a work area. The control unit 11 has a program A as one of the programs and realizes each function such as a data acquisition unit 20, an issuer determination unit 21, a display control unit 22, and the like according to the program A. The program A is an image processing program causing a computer to execute processing on document image data generated by reading a document. In addition, the program A is an application for executing saving and management of document image data.

The communication IF 14 is an IF that executes communication with the outside in a wired or wireless manner according to a predetermined communication protocol including a known communication standard. In the example of FIG. 1, the image processing apparatus 10 is connected to the scanner 30 via the communication IF 14. The image processing apparatus 10 may be connected to an external network via the communication IF14 or another communication IF (not shown), and the control unit 11 may also upload document image data acquired from the scanner 30 to, for example, an external server (not shown) via the network (local area network, Internet communication network, and the like).

The display unit 12 is means for displaying visual information and consists of, for example, a liquid crystal display (LCD), an organic EL display, or the like. The display unit 12 may include a display and a drive circuit for driving the display. The operation receiving unit 13 is means for receiving an operation by a user and is realized by, for example, a physical button, a touch panel, a mouse, a keyboard, or the like. Of course, the touch panel may be realized as one function of the display unit 12. In addition, the display unit 12 and the operation receiving unit 13 may collectively be referred to as an operation panel or the like.

A part of configuration shown in FIG. 1, such as the display unit 12, the operation receiving unit 13, the storage unit 15, or the like, may be peripheral devices externally attached to the image processing apparatus 10. It is also possible to assume the configuration including the image processing apparatus 10 and the scanner 30 shown in FIG. 1 as one system. Alternatively, the image processing apparatus 10 and the scanner 30 may be entirely included in one apparatus as a matter of fact. In a case where the image processing apparatus 10 and the scanner 30 are included in one apparatus, such one apparatus may be referred to as a reading apparatus or the like. In addition, the configuration including the image processing apparatus 10 and the scanner 30 may be a multifunctional apparatus having a plurality of functions as a printer (copier), a facsimile, or the like.

2. First Embodiment

Figure 2:
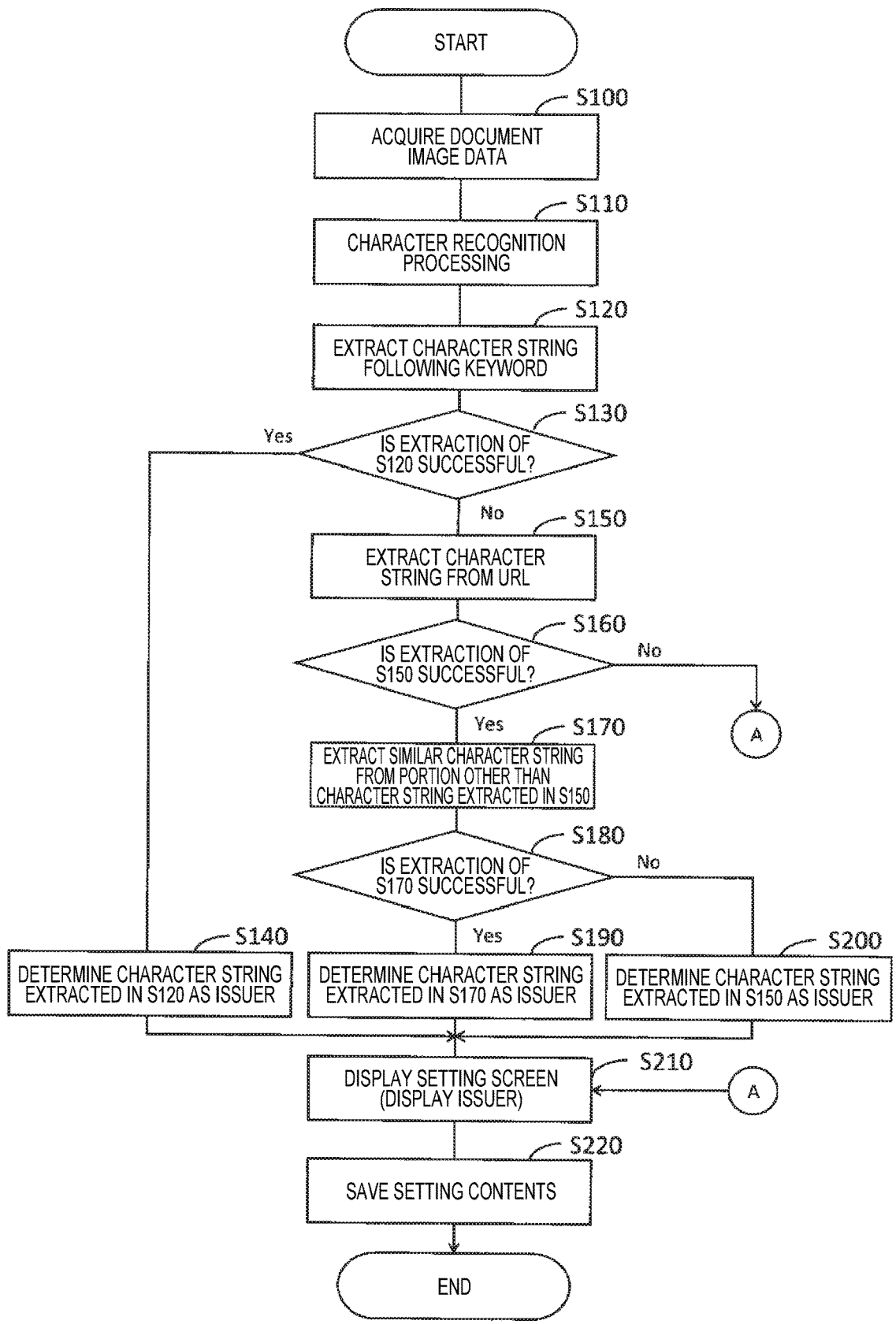
FIG. 2 is a flowchart showing processing according to a first embodiment.

FIG. 2 is a flowchart showing processing executed by the control unit 11 according to the program A. The flowchart of FIG. 2 includes processing of determining an issuer of the document. The embodiment described according to the flowchart of FIG. 2 is also referred to as a first embodiment.

The scanner 30 generates image data by reading a document arbitrarily set by the user. In the embodiment, the document that the user reads by the scanner 30 is a document in which at least characters are described. More specifically, the document is a kind of receipt or form. A form is, for example, a bill, an estimate, a contract, or the like. The scanner 30 transmits the image data (document image data) as the reading result of the document to the image processing apparatus 10. The control unit 11 may instruct the scanner 30 to start reading the document via the communication IF14, and the scanner 30 may start reading a document in accordance with the instruction to start the reading from the control unit 11.

The data acquisition unit 20 acquires the document image data transmitted from the scanner 30 as described above via the communication IF 14 (step S100). Instead of directly acquiring (receiving) document image data from the scanner 30, the data acquisition unit 20 may acquire document image data from the storage unit (for example, the storage unit 15) as a transfer destination to which the document image data is transferred from the scanner 30.

The issuer determination unit 21 recognizes character strings included in the document image data by performing character recognition (OCR) on the document image data acquired by the data acquisition unit 20 in step S100 (step S110). In this case, the issuer determination unit 21 converts the character string and the recognizable objects included in the document image data into character data (text data). Since the character recognition processing is a well-known technique, the description thereof is omitted.

In step S120, the issuer determination unit 21 extracts character strings following a predetermined keyword from the character strings (character strings in data) included in the document image data recognized in step S110. The predetermined keyword is a character string expected to continue before or after a character string representing an issuer of a document and is stored in advance in the storage unit 15. Here, assuming that the user scans a receipt issued at a store that he or she has used as a document with the scanner 30, several character strings such as "welcome to", "visiting for", "shopping at", and the like, which are highly likely to be described before a store name that is the issuer of the receipt, are stored in advance as predetermined keywords.

In step S130, the issuer determination unit 21 branches subsequent processing depending on whether or not the character string extraction has succeeded in step S120. In a case where the character string extraction has succeeded in step S120, the issuer determination unit 21 makes a "Yes" determination in step S130 and proceeds to step S140. On the other hand, in a case where the character string extraction has not succeeded in step S120, the issuer determination unit 21 makes a "No" determination in step S130 and proceeds to step S150.

If any one of predetermined keywords (for example, "welcome to", "visiting for", "shopping at", and the like) is included in the character strings in the data, the issuer determination unit 21 extracts a character string following a predetermined keyword in the character strings in the data in step S120 and makes a "Yes" determination in step S130. In step S120, for example, the issuer determination unit 21 extracts a character string consisting of words within a predetermined number of words following a predetermined keyword or a character string consisting of characters within a predetermined number of characters following a predetermined keyword, in the character strings in the data. In addition, in step S120, the issuer determination unit 21 extracts a range up to a predetermined expression (an expression such as "Corporation", "Incorporated", "Company", "Limited" or the abbreviations thereof such as "Corp.", "Inc.", "Co.", "Ltd.") which is a character string following a predetermined keyword in the character strings in the data and which is often attached to the last of the store name, business name, and the like.

In a case where no predetermined keyword is included in the character strings in the data, since the character strings may not be extracted in step S120, the issuer determination unit 21 makes a "No" determination in step S130.

In step S140, the issuer determination unit 21 determines the character string extracted in step S120 as the issuer of the document and proceeds to step S210.

In step S150, the issuer determination unit 21 extracts a character string as a candidate of an issuer from URL (uniform resource locator) information in the character strings in the data based on a specific rule for extracting an issuer of a document. In some documents such as receipts, URL information may be written so that the user may access various information on the document issuer through the Internet. The specific rule is described in rule data 16, and the rule data 16 is stored in advance in the storage unit 15. The specific rule defines a suitable rule for extracting a character string corresponding to the store name and the business name included in the URL information, and for example, "a character string after the character string "www." or "a character string before the character string ".jp" should be extracted.

As a specific example, in a case where a character string corresponding to the URL information "http://www.xyz.jp/" is included in the character strings in the data, in step S150, the issuer determination unit 21 may extract the character string "xyz" from the URL information based on the specific rule described above.

In step S160, the issuer determination unit 21 branches subsequent processing depending on whether or not the character string extraction has succeeded in step S150. In step S150, in a case where a character string may be extracted from the URL information in the character strings in the data based on the specific rule, the issuer determination unit 21 makes a "Yes" determination in step S160 and proceeds to step S170. In the first embodiment, the character string extracted from the URL information in the character strings in the data based on the specific rule in step S150 is also referred to as "first character string".

On the other hand, in step S150, in a case where a character string may not be extracted from the URL information in the character strings in the data based on the specific rule, for example, in a case where the URL information is not included in the character strings in the data, the issuer determination unit 21 makes a "No" determination at step S160 and proceeds to step S210.

In step S170, the issuer determination unit 21 extracts a character string similar to a first character string from a portion other than the character string (first character string) extracted in step S150 in the character strings in the data. The similar character string means a character string matching the first character string or a character string, a part of which matches the first character string. However, even if a part of the first character string matches a character string, it is not appropriate to use a similar character string as a character string in which only one character matches. Therefore, the issuer determination unit 21 may regard a character string, a predetermined percentage or more of which matches the first character string including the arrangement order of characters configuring the first character string, as a similar character string.

As in the above specific example, in the case of extracting the character string "xyz" from the URL information included in the character strings in the data in step S150, in step S170, the issuer determination unit 21 extracts a character string similar to the character string "xyz" from the character strings other than the URL information in the character strings in the data. For example, if a character string "Xyz Corporation" is included in the character strings other than the URL information in the character strings in the data, the character string "Xyz Corporation" is extracted as a similar character string.

The character string extracted from the URL information in step S150 may be a part of the name of the document issuer or may be an abbreviation and may not correctly represent the issuer of the document. In view of such a situation, step S170 is processing of extracting a character string which is more likely to properly express the issuer of the document than the character string extracted in step S150. Therefore, as one aspect of step S170, it is preferable that the issuer determination unit 21 not only extracts a character string that matches the first character string and a part of the first character string but also a range including character strings before and after such a character string as a similar character string. For example, in step S170, the issuer determination unit 21 may extract not only words that matches the first character string or a part of which matches the first character string but also a predetermined expression (an expression such as "Corporation", "Incorporated", "Company", "Limited" or the abbreviations thereof such as "Corp.", "Inc.", "Co.", "Ltd.") following such words and often attached at the end of the store name, business name, and the like.

In addition, in step S170, the issuer determination unit 21 may extract not only words that match the first character string or words or a part of which matches the first character string but also such words as words in the same line or words having the same font and character size within the same line, as a similar character string.

In step S180, the issuer determination unit 21 branches subsequent processing depending on whether or not the character string extraction has succeeded in step S170. In step S170, in a case where a character string similar to the first character string may be extracted from a portion other than the first character string extracted in the character strings in the data in step S150, the issuer determination unit 21 makes a "Yes" determination in step S180 and proceeds to step S190. In the first embodiment, the similar character string extracted in step S170 is also referred to as "second character string". On the other hand, in step S170, in a case where a character string similar to the first character string may not be extracted from a portion other than the first character string extracted in the character strings in the data in step S150, the issuer determination unit 21 makes a "No" determination in step S180 and proceeds to step S200.

In step S190, the issuer determination unit 21 determines the character string (the second character string) extracted in step S170 as the issuer of the document and proceeds to step S210.

In step S200, the issuer determination unit 21 determines the character string (the first character string) extracted in step S150 as the issuer of the document and proceeds to step S210.

In step S210, the display control unit 22 causes the display unit 12 to display a setting screen for setting various information on the document. In addition, in step S210, the display control unit 22 displays the issuer determined in any one of steps S140, S190, and S200 in the setting screen.

Figure 3:
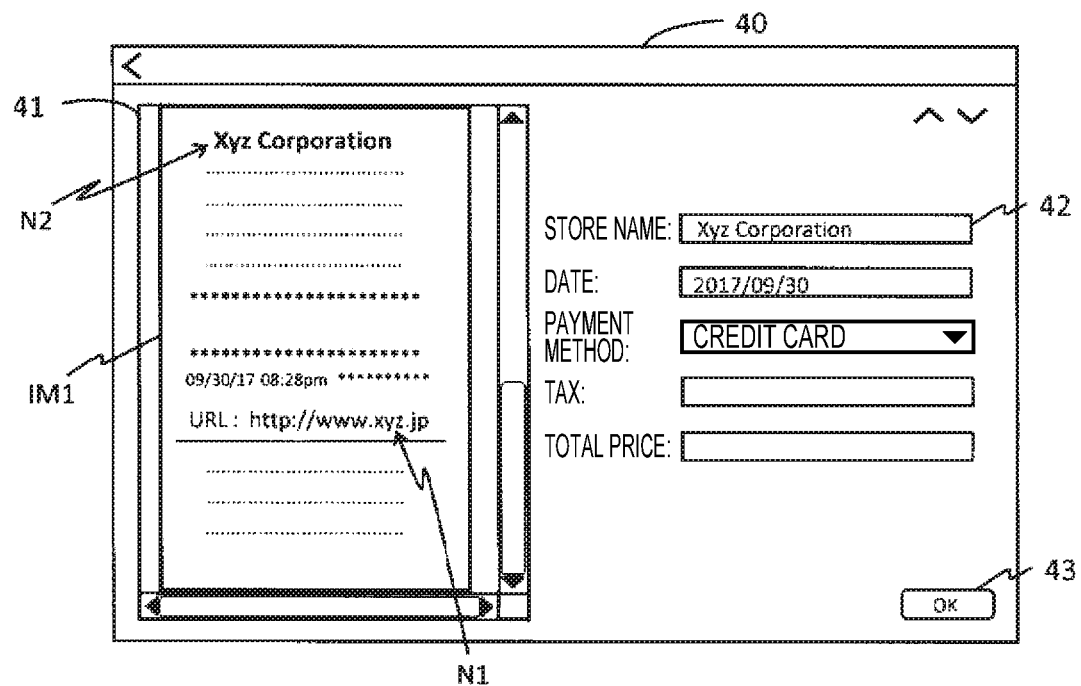
FIG. 3 is a diagram showing an example of a setting screen.

FIG. 3 shows an example of a setting screen 40 displayed by the display control unit 22 on the display unit 12 in step S210. The setting screen 40 includes a document image display field 41, an issuer setting field 42, a save button (OK button) 43, and the like. In the document image display field 41, an image IM1 based on the document image data acquired in step S100, that is, a document is displayed. The user may visually recognize the document read by the scanner 30 through the document image display field 41. In the example of FIG. 3, the image IM1 displayed in the document image display field 41 is an image of a receipt as a document.

The issuer setting field 42 is an input field for setting the issuer of the document (store name, business name, and the like). On the setting screen 40, in addition to the issuer setting field 42, for example, each setting field for setting various kinds of information concerning a document, such as an issue date of the document, a payment method of the price, an amount of the tax, the total price, and the like is provided. The user may arbitrarily perform input for each setting field including the issuer setting field 42 and editing of contents set in each setting field by operating the operation receiving unit 13 or the like.

In the first embodiment, when the process proceeds from step S140 to step S210, the display control unit 22 displays the setting screen 40 in a state in which the issuer determined in step S140 is set in the issuer setting field 42 on the display unit 12. In addition, when the process proceeds from step S190 to step S210, the display control unit 22 displays the setting screen 40 in a state in which the issuer (the second character string) determined in step S190 is set in the issuer setting field 42 on the display unit 12. In addition, when the process proceeds from step S200 to step S210, the display control unit 22 displays the setting screen 40 in a state in which the issuer (the first character string) determined in step S200 is set in the issuer setting field 42 on the display unit 12. In a case where the process proceeds from step S160 to step S210, the display control unit 22 displays the setting screen 40 in a state in which the issuer setting field 42 is left blank since the issuer of the document is not determined, on the display unit 12.

In the example of FIG. 3, the image IM1, that is, the entire document is not necessarily displayed in the document image display field 41, but as indicated by symbols N1 and N2, the character strings (character strings in data) in the image IM1 contains a first character string N1 "xyz" as a part of the URL information and a second character string N2 "Xyz Corporation" which is a character string similar to the first character string N1. In addition, it is assumed that the above-described predetermined keyword is not included in the character strings in the image IM1. Therefore, after making a "No" determination in step S130, the control unit 11 extracts the first character string N1 "xyz" from the URL information in step S150, and extracts the second character string N2 "Xyz Corporation" from other than the URL information in step S170, determines the second character string N2 "Xyz Corporation" as the issuer of the document in step S190, and as a result, a case where the setting screen 40 in a state in which "Xyz Corporation" is set in the issuer setting field 42 from the beginning is displayed is shown in FIG. 3 in step S210. Since "Xyz Corporation" is displayed as a character string indicating the issuer of the document in the issuer setting field 42 at the time the setting screen 40 is displayed on the display unit 12, the burden of inputting the issuer of the document into the setting screen 40 is reduced for the user.

In the case of accepting a predetermined operation for ending an setting input to the setting screen 40, for example, the operation of the OK button 43, from the user, the control unit 11 saves the current setting contents in the setting fields of the setting screen 40 together with the document image data acquired in step S100 in the storage unit 15 or the like (step S220), closes the setting screen 40, and end the flowchart of FIG. 2. The setting contents corresponding to the setting fields which are blank at the time when the OK button 43 is operated are stored without settings or in a state of predetermined default settings. The user may edit the setting contents stored together with the document image data at any time by opening the setting screen 40 again.

3. Second Embodiment

Figure 4:
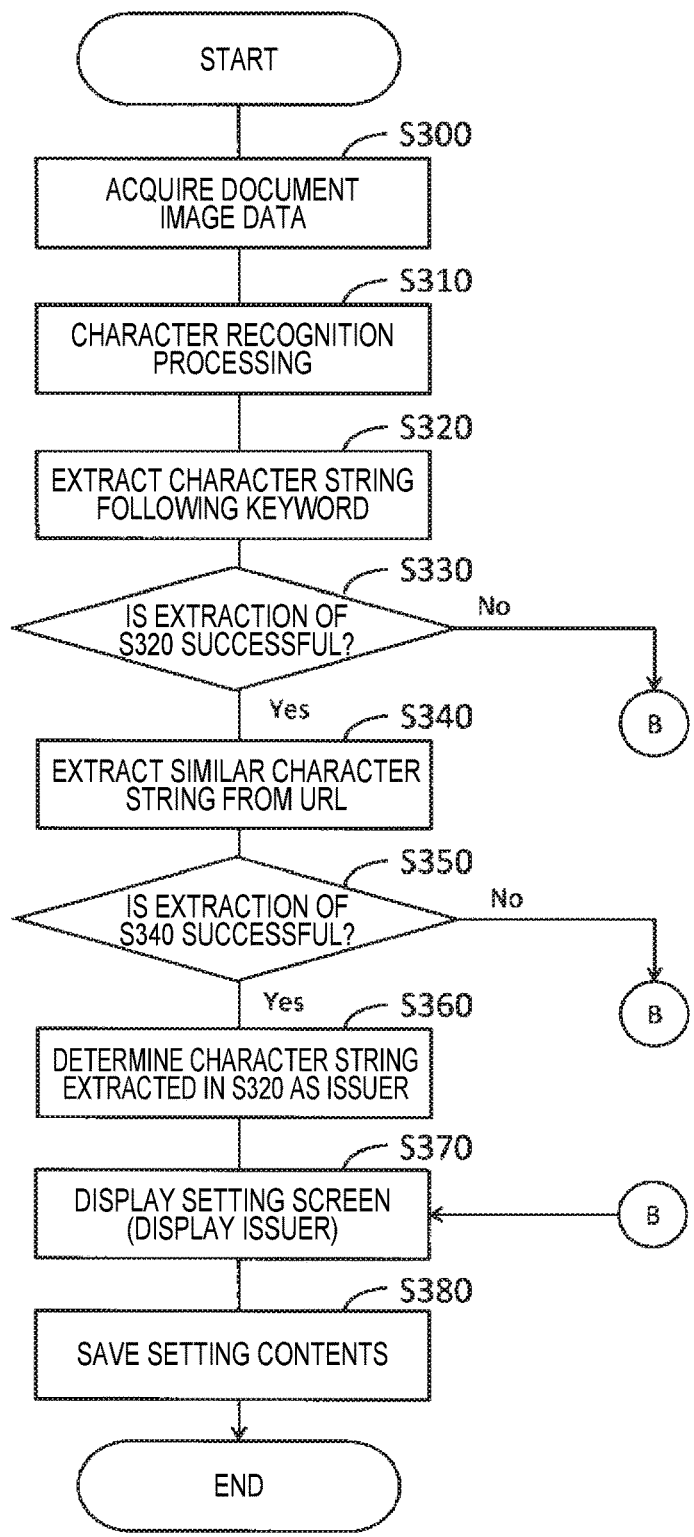
FIG. 4 is a flowchart showing processing according to a second embodiment.

FIG. 4 shows processing executed by the control unit 11 according to the program A and different from that in FIG. 2 by a flowchart. The flowchart of FIG. 4 includes processing of determining an issuer of the document. The embodiment described according to the flowchart of FIG. 4 is also referred to as a second embodiment. With regard to the second embodiment, descriptions of matters common to the matters already described are omitted as appropriate.

Steps S300 and S310 are the same as steps S100 and S110 of FIG. 2.

In step S320, the issuer determination unit 21 extracts character strings following a predetermined keyword from the character strings (character strings in data) included in the document image data recognized in step S310. That is, step S320 is the same processing as step S120 in FIG. 2. However, in the second embodiment, it is assumed that the processing of step S320 is processing of extracting the first character string as a candidate of the issuer from the character strings in the data based on a specific rule for extracting an issuer of a document. That is, in the rule data 16 stored in the storage unit 15, predetermined keywords as described above are defined, and "a character string that follows a predetermined keyword" should be extracted.

As a specific example, it is assumed that the character string "Welcome to Xyz Corporation" is included in the character strings in the data. In this case, in step S320, the issuer determination unit 21 may extract the character string "Xyz Corporation" following the predetermined keyword "welcome to" from the character strings in the data as the first character string based on the specific rule.

In step S330, the subsequent processing branches depending on whether or not a character string (first character string) following the predetermined keyword has been successfully extracted from the character strings in the data based on the specific rule in step S320 by the issuer determination unit 21. In a case where the character string extraction has succeeded in step S320, the issuer determination unit 21 makes a "Yes" determination in step S330 and proceeds to step S340. On the other hand, in a case where the character string extraction has not succeeded in step S320, the issuer determination unit 21 makes a "No" determination in step S330 and proceeds to step S370.

In step S340, the issuer determination unit 21 extracts a character string similar to the first character string from a portion other than the first character string extracted in step S320 in the character strings in the data. However, in step S340, the issuer determination unit 21 extracts a character string similar to the first character string from the URL information included in the character strings in the data. In other words, in the second embodiment, a portion other than the first character string extracted in step S320 in the character strings in the data is limited to the URL information included in the character strings in the data and an attempt is made to extract a similar character string. As a specific example, in a case where a character string corresponding to the URL information "http://www.xyz.jp/" is included in the character strings in the data, in step S340, the issuer determination unit 21 may extract the character string "xyz" that is a character string similar to the first character string "Xyz Corporation" extracted in step S320.

In step S350, the issuer determination unit 21 branches subsequent processing depending on whether or not the character string extraction has succeeded in step S340. In step S340, in a case where a character string similar to the first character string may be extracted from a portion (URL information) other than the first character string extracted in the character strings in the data in step S320, the issuer determination unit 21 makes a "Yes" determination in step S350 and proceeds to step S360. In the second embodiment, the similar character string extracted in step S340 is also referred to as "second character string". On the other hand, in step S340, in a case where a character string similar to the first character string may not be extracted from a portion (URL information) other than the first character string extracted in the character strings in the data in step S320, the issuer determination unit 21 makes a "No" determination in step S350 and proceeds to step S370.

In step S360, the issuer determination unit 21 determines the character string (the first character string) extracted in step S320 as the issuer of the document and proceeds to step S370.

In step S370, the display control unit 22 causes the display unit 12 to display a setting screen for setting various information on the document. In addition, in step S370, the display control unit 22 displays the issuer determined in step S360 in the setting screen.

Figure 5:
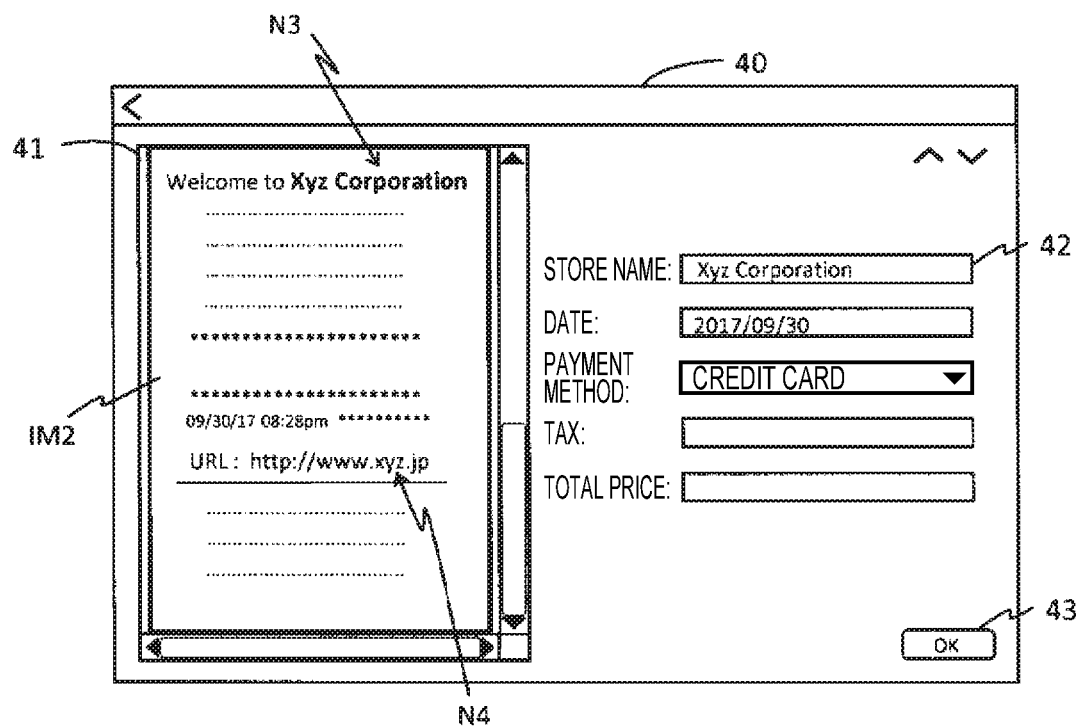
FIG. 5 is a diagram showing another example of a setting screen.

FIG. 5 shows the setting screen 40 displayed by the display control unit 22 on the display unit 12 in step S370, which is different from FIG. 3. However, the configuration of the setting screen 40 is the same in both FIGS. 3 and 5. In the example of FIG. 5, an image IM2 based on the document image data acquired in step S300, that is, a document is displayed in the document image display field 41 of the setting screen 40. The image IM2 is also an image of a receipt as a document.

In the second embodiment, when the process proceeds from step S360 to step S370, the display control unit 22 displays the setting screen 40 in a state in which the issuer determined in step S360 is set in the issuer setting field 42 on the display unit 12. When the process proceeds from step S330 or step S350 to step S370, the display control unit 22 displays the setting screen 40 in a state in which the issuer setting field 42 is left blank since the issuer of the document is not determined, on the display unit 12.

In the example of FIG. 5, the image IM2, that is, the entire document is not necessarily displayed in the document image display field 41, as indicated by symbols N3 and N4, the character strings (character strings in data) in the image IM2 contains a first character string N3 "Xyz Corporation" following the predetermined keyword "welcome to" and a second character string N4 "xyz" in the URL information which is a character string similar to the first character string N3. Therefore, the control unit 11 extracts the first character string N3 "Xyz Corporation" based on the predetermined keyword in step S320, further extracts the second character string N4 "xyz" from the URL information in step S340, determines the first character string N3 "Xyz Corporation" as the issuer of the document in step S360, and as a result, a case where the setting screen 40 in a state in which "Xyz Corporation" is set in the issuer setting field 42 from the beginning is displayed is shown in FIG. 5 in step S370.

In the case of accepting a predetermined operation for ending an setting input to the setting screen 40, for example, the operation of the OK button 43, from the user, the control unit 11 saves the current setting contents in the setting fields of the setting screen 40 together with the document image data acquired in step S300 in the storage unit 15 or the like (step S380), closes the setting screen 40, and end the flowchart of FIG. 4.

4. Summary

As described above, according to the embodiment, the image processing apparatus 10 includes the control unit 11 that acquires document image data generated by reading a document and recognizes character strings (character strings in data) included in the document image data by character recognition and the storage unit 15 that stores a specific rule (rule data 16 describing a specific rule) for extracting an issuer of the document. Then, as a concept including the first embodiment and the second embodiment, the control unit 11 executing the program A extracts the first character string from the character strings in the data based on the specific rule, further extracts the second character string, least a part of which matches the first character string from a portion other than the first character string in the character strings in the data, and determines the first character string or the second character string as the issuer. As a result, the control unit 11 does not require complicated steps as in the related art and may determine the issuer from either the first character string or the second character string, thereby enhancing the possibility of properly determining the issuer of the document.

In addition, according to the first embodiment, the control unit 11 extracts the first character string from the URL information in the character strings in the data based on the specific rule (step S150). The domain name configuring the URL information in the character strings in the data often includes a character string corresponding to the issuer of the document such as a receipt, that is, store name or business name. Therefore, by extracting a character string from the URL information based on the specific rule as described above, it is consequently possible to extract a character string having a high possibility of representing the issuer of the document as the first character string.

In addition, according to the first embodiment, in a case where the second character string may be extracted in step S170 ("Yes" in step S180), the control unit 11 determines the second character string as the issuer (step S190). As described above, the first character string extracted from the URL information in step S150 may be a part of the name of the document issuer or may be an abbreviation and may not correctly represent the issuer of the document. Therefore, as a result, the control unit 11 may determine a character string having a high possibility of accurately representing an issuer of a document as the issuer of the document by extracting the second character string as the character string similar to the first character string from other than the URL information and determining this second character string as the issuer.

In addition, according to the first embodiment, in a case where the second character string may not be extracted in step S170 ("No" in step S180), the control unit 11 determines the first character string as the issuer (step S200). As a result, it is possible to avoid situations in which an issuer may not be determined as much as possible and to present to the user the setting screen 40 in which the character string which is likely to be an issuer of a document is set in the issuer setting field 42.

In addition, according to the second embodiment, the control unit 11 extracts a character string following the predetermined keyword specified by the specific rule from the character strings in the data, as the first character string (step S320). According to such a configuration, for example, it is possible to extract a character string having a high possibility of accurately representing the issuer of the document as the first character string by extracting the character string from the character strings in the data based on the keyword strongly inferred that the character string representing the document issuer such as "welcome to" follows.

In addition, according to the second embodiment, in a case where the second character string may be extracted in step S340 ("Yes" in step S350), the control unit 11 determines the first character string as the issuer (step S360). According to such a configuration, as a character string (second character string) similar to the first character string, which is extracted from the character strings in the data because the character string follows the predetermined keyword, may be extracted from another place in the character strings in the data, it may be confirmed that the first character string is appropriate as a character string representing the issuer of the document. Therefore, it is possible to determine a character string highly likely to accurately represent the issuer of the document as the issuer of the document.

In addition, in any of the first embodiment and the second embodiment, the character string determined by the control unit 11 as representing the issuer of the document is displayed on the display unit 12. That is, the issuer of the document is automatically displayed in the issuer setting field 42 of the setting screen 40. If the user does not like the displayed issuer, the user may arbitrarily edit the displayed issuer, but since the displayed issuer has a high possibility of accurately representing the issuer of the document as described above, it is possible to reduce the burden of the user inputting and editing the issuer of the document.

As apparent from the above description, the program A as an image processing program causes the processor to execute a control function of recognizing character strings (character strings in data) included in the document image data by character recognition. Then, the control function extracts the first character string from the character strings in the data based on the specific rule, and extracts the second character string, at least a part of which matches the first character string from a portion other than the first character string in the character strings in the data, and causes the processor to determine the first character string or the second character string as the issuer of the document. The embodiment also discloses a method corresponding to processing by the image processing program and a computer-readable storage medium storing the image processing program.

5. Modification Example

The embodiment is not limited to the contents described above, but includes various modification examples as described later. Embodiments in which each embodiment and each modification example are combined are also included in the scope of disclosure according to the present specification.

First Modification Example

The control unit 11 may perform character recognition of a language corresponding to the region name indicated by the domain name configuring the URL information included in the character strings in the data. For example, in step S150, the control unit 11 recognizes a character string ".jp" indicating a region name as a part of the domain name of the URL information along with extraction of the first character string from the URL information. In this case, when extracting a character string (second character string) similar to the first character string from the portion other than the first character string in the character strings in the data in step S170, character recognition processing in Japanese that is a language corresponding to the character string ".jp" is executed on the character strings in the data, and the character string similar to the first character string is extracted.

When extracting a similar character string, the control unit 11 regards character strings having the same meaning in different languages to be similar. For example, in a case where the extracted first character string is a character string "tokyo" described with an alphabet and a character string "Tokyo" written in kanji is present in the character strings in the data, the control unit 11 extracts the character string "Tokyo" as a character string similar to the first character string in step S170. In this way, the control unit 11 may improve the character recognition rate for the character strings in the data and further improve the possibility of extracting a character string accurately representing the issuer of the document from the character strings in the data by performing character recognition of a language corresponding to the region name indicated by the domain name configuring the URL information.

However, in the first modified example, it does not mean that the language of the recognition target should be restricted with respect to the character recognition processing executed in step S110 or step S310. At the timing of step S110 or step S310, if the control unit 11 executes character recognition processing on the character strings in the data in English, Japanese and other plural languages, there is no need to re-execute the character recognition processing based on the language that has already been executed in subsequent steps, for example, in step S170. In other words, if the control unit 11 does not yet execute the character recognition of the language corresponding to the region name indicated by the domain name configuring the URL information included in the character strings in the data in step S110 or step S310, it is possible to improve the character recognition rate for the character strings in the data by performing the character recognition processing of the language corresponding to the region name at the timing later than step S110 or step S310.

Second Modification Example

The storage unit 15 may store the number-of-times-of-saving information in which the number of times of saving of the issuer associated with the document image data is recorded for each issuer, and the control unit 11 may refer to the number-of-times-of-saving information stored in the storage unit 15 to determine a character string having a large number of times of saving among the first character string and the second character string as the issuer. That is, the storage unit 15 stores the number of times of saving for each issuer stored together with the document image data in step S220 or step S380.

In the first embodiment, in step S220, when saving the setting contents of the setting fields on the setting screen 40 together with the document image data acquired in step S100, the control unit 11 increases the number of times of saving in the current the number-of-times-of-saving information on the issuer set in the issuer setting field 42 by one. In step S190, as described above, the control unit 11 does not simply determine the second character string extracted in step S170 as the issuer of the document, but also determines a character string having a large number of times of saving in the current number-of-times-of-saving information as the issuer among the first character string extracted in step S150 and the second character string extracted in step S170.

As a specific example, it is assumed that the control unit 11 extracts the character string "xyz" as the first character string from the URL information in the character strings in the data in step S150 and extracts the character string "Xyz Corporation" and the character string "Xyz Corp." as the second character strings from the portion other than the URL information in the character strings in the data in step S170. In addition, at the time of step S190 after the determination in step S180 after step S170, it is assumed that the number of times of saving of the character strings "xyz", "Xyz Corporation", and "Xyz Corp." in the number-of-times-of-saving information is 0 for the character string "xyz", 10 for the character string "Xyz Corporation", and 1 for the character string "Xyz Corp.", respectively. In such a case, the control unit 11 determines the character string "Xyz Corporation", which has the largest number of times of saving, among the character strings "xyz", "Xyz Corporation" and "Xyz Corp.", as the issuer of the document in step S190.

According to such a second modification, among a plurality of character strings extracted from the character strings in the document data, the character string which has a large number of times of saving so far, that is, the character string which the user has frequently acknowledged so far as the issuer of the document is determined as the issuer of the document.

Also, in the second embodiment, in step S380, when saving the setting contents of the setting fields on the setting screen 40 together with the document image data acquired in step S300, the control unit 11 increases the number of times of saving in the current the number-of-times-of-saving information on the issuer set in the issuer setting field 42 by one. In step S360, as described above, the control unit 11 does not simply determine the first character string extracted in step S320 as the issuer of the document, but may determine a character string having a large number of times of saving in the current number-of-times-of-saving information as the issuer among the first character string extracted in step S320 and the second character string extracted in step S340.

Other Description

FIGS. 3 and 5 only show an example of the display form of the document issuer. There are various layouts, designs and roles of the screen for presenting the issuer of the document to the user.

All the steps described in the flowcharts of FIGS. 2 and 4 are not necessarily indispensable in the embodiment. For example, it is not indispensable to cause the display unit 12 to display the issuer of the document determined by the control unit 11 as described above (present to the user through setting screen 40) in step S210 or step S370. For example, in a case where the first character string or the second character string is determined as an issuer of the document, the control unit 11 may simply save the determined character string as the issuer in association with the document image data.

In addition, in the flowchart of FIG. 2, steps S120, S130, and S140 may be omitted. In other words, the control unit 11 may execute step S150 after step S110.

This application claims priority to Japanese Application No. 2018-014374, filed 31 Jan. 2018, the entirety of which is incorporated by reference herein.

What is claimed is:

1. An image processing apparatus comprising:
   a processor that acquires document image data generated by reading a document and recognizes character strings included in the document image data by character recognition; and
   a storage that stores a specific rule for extracting an issuer of the document,
   wherein the processor extracts a first character string from the character strings included in the document image data based on the specific rule, extracts a second character string which matches at least a part of the first character string from a portion other than the first character string among the character strings included in the document image data, and determines the first character string or the second character string as the issuer.

2. The image processing apparatus according to claim 1, wherein the processor extracts the first character string from URL information in the character strings included in the document image data based on the specific rule.

3. The image processing apparatus according to claim 2, wherein the processor executes character recognition of a language corresponding to a region name indicated by a domain name configuring the URL information and then extracts the second character string.

4. The image processing apparatus according to claim 1, wherein the processor extracts a character string following a keyword specified by the specific rule from the character strings included in the document image data, as the first character string.

5. The image processing apparatus according to claim 2, wherein, in a case where the second character string is extracted, the processor determines the second character string as the issuer.

6. The image processing apparatus according to claim 2, wherein, in a case where the second character string is not extracted, the processor determines the first character string as the issuer.

7. The image processing apparatus according to claim 4, wherein, in a case where the second character string is extracted, the processor determines the first character string as the issuer.

8. The image processing apparatus according to claim 1, wherein the storage stores the number-of-times-of-saving information in which the number of times of saving of the issuer associated with the document image data is recorded for each issuer, and
   the processor refers to the number-of-times-of-saving information and determines a character string having a large number of times of saving among the first character string and the second character string as the issuer.

9. A non-transitory computer-readable computer medium storing an image processing program causing a computer to execute processing on document image data generated by reading a document, the processing comprising:
   executing a control function of recognizing a character string included in the document image data by character recognition,
   wherein the control function extracts a first character string from the character strings included in the document image data based on a specific rule for extracting an issuer of the document, extracts a second character string which matches at least a part of the first character string from a portion other than the first character string among the character strings included in the document image data, and determines the first character string or the second character string as the issuer.

* * * * *